July 6, 1965     D. L. GAMMILL     3,192,902
AUTOMATIC FEEDER

Filed Aug. 12, 1963     2 Sheets-Sheet 1

Diemer L. Gammill INVENTOR.

BY
Attorneys

July 6, 1965 D. L. GAMMILL 3,192,902
AUTOMATIC FEEDER
Filed Aug. 12, 1963 2 Sheets-Sheet 2

Diemer L. Gammill
INVENTOR.

United States Patent Office 3,192,902
Patented July 6, 1965

3,192,902
AUTOMATIC FEEDER
Diemer L. Gammill, Rte. 1, Petersburg, Tenn.
Filed Aug. 12, 1963, Ser. No. 301,565
4 Claims. (Cl. 119—51.11)

The present invention is generally concerned with the automatic feeding of animals, and is more particularly directed toward a novel device specifically adapted for the control dispensing of milk or a milk replacer to suckling animals maintained in individual pens.

Inasmuch as it is known that suckling animals, in particular calves, can be most successfully raised by segregating the calves into individual pens, it is a primary object of the instant invention to provide a means whereby the calves so segregated can be expeditiously fed.

In the supplying of liquid food to the individual pens, the instant invention contemplates the use of a central feed container within which the milk or milk replacer is heated, and an elongated supply pipe or line having its opposite ends in communication with the feed container and including a plurality of feeding nipples, one located in each pen.

In conjunction with the above structure, the instant invention also contemplates the provision of a pump which circulates the liquid food through the supply line at a substantially greater rate than it can be consumed thus insuring that none of the nutrients which might have been added have a chance to settle out, the unconsumed food flowing back into the feed container effecting a slight agitation and mixing of the liquid food.

In addition, it is an object of the instant invention to so orientate the supply pipe relative to the feed container as to prevent a gravity flow of the milk or milk replacer from the feed container, the milk only flowing under the influence of the pump when such is activated.

Further, it is an object of this instant invention to provide a timer for both automatically starting and stopping the pump and for fixing the duration of each cycle.

Also, it is an object of the instant invention to provide a regulating means in conjunction with each feeding nipple thereby enabling a varying of the amount of liquid food which can be obtained by each individual animal, this being particularly significant due to the fact that, as will be appreciated by those familiar with animal raising, the amount of food which the animals can safely take at one time varies, sometimes appreciably, with the individual animal.

Likewise, it is an object of the instant invention to provide for the rapid and even heating of the food within the container, the rapid flow of the food to the supply line substantially eliminating any appreciable cooling of the food prior to its consumption or return to the container.

In addition, it is a significant object of the instant invention to provide a device for accomplishing the above objects which is basically simple in construction, relatively easy to operate, and substantially carefree, requiring little or no maintenance over extended periods of time other than an occasional cleaning of the elements so as to maintain the desired sanitary conditions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a schematic view of the wiring for the instant invention.

Figure 1:
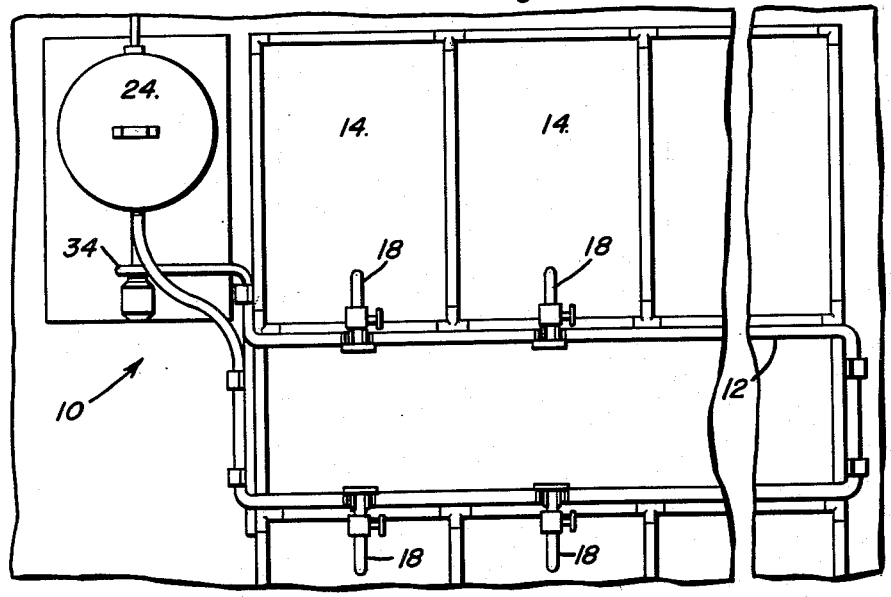
FIGURE 1 is a top plan view of the feeder of the instant invention orientated so as to accommodate a plurality of individual pens.

Referring now more specifically to the drawings, reference numeral 10 is used to generally designate the overall automatic feeder, the feeder 10, through a supply line 12, accommodating any number of individual animal pens 14.

In addition to the supply line 12, the feeder 10 consists basically of a feed container 16 within which a supply of the liquid food, such as milk or a milk replacer, is maintained, and a plurality of feeding nipples 18, each nipple 18 being in communication with the supply line or pipe 12, with each of the pens 14 having one of the nipples 18 extending thereinto.

Figure 4:
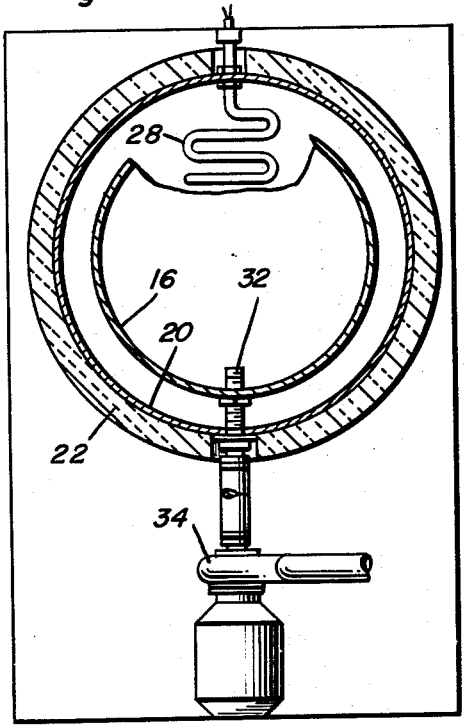
FIGURE 4 is a cross-sectional view taken substantially on a plane passing along line 4—4 of FIG. 2.
Figure 4:
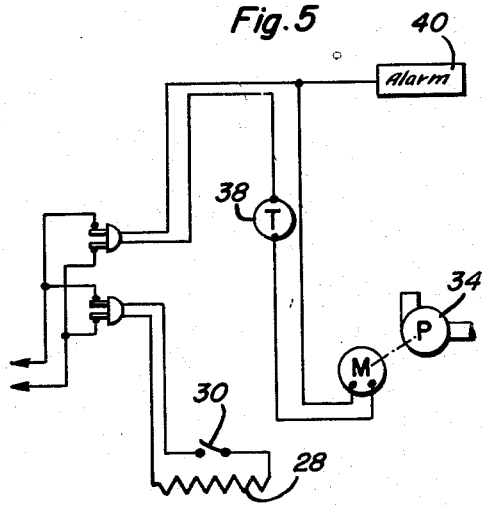
Figure 2:
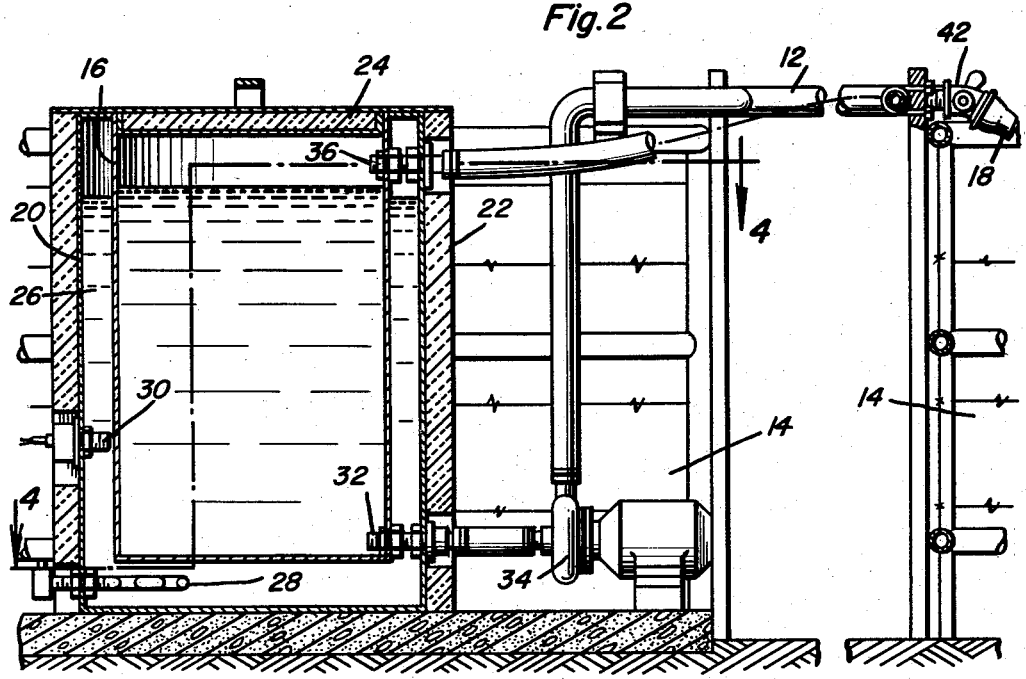
FIGURE 2 is an elevational view of the device illustrating the container and heater portion thereof in section.

With particular reference to FIGS. 2 and 4, it will be noted that the feed container 16 is surrounded and enclosed by an enlarged sealed water tank 20 which is, in turn, enclosed within an insulating jacket 22. The feed container 16, aside from the upper end thereof which has a removable insulated closure 24 thereon for enabling the introduction of a supply of liquid food, is spaced from the walls of the water tank 20, water 26 being provided therein to a height substantially equal to the height of the liquid food within the container 16. Incidently, the container 16 can be supported within the water tank 20 in any suitable manner such as by welding the upper edge thereof to the surrounding top of the water tank or by the provision of a plurality of supporting feet. The milk or milk replacer within the container 16 is to be heated by first heating the surrounding water 26 through the use of a suitable heating element 28 orientated within the water tank 20 out of contact with the container 16 and controlled by a temperature responsive switch or thermostat 30. By so surrounding the feed container with heated water, it will be appreciated that the liquid food can be rapidly heated and easily maintained at the desired temperature, with the additional advantage of all of the food being generally consistently heated.

In order to prevent a settling out of any nutrients in the container itself, and to insure that such nutrients be supplied to the suckling animals within the pens 14, the intake portion or end 32 of the supply line or pipe 12 is located at the bottom of the container 16 with the flow of liquid food being induced by a motor driven pump 34. It will be noted that the supply line 12, aside from the intake end portion thereof, is located generally above the level of the supply of liquid food thus eliminating the tendency for a gravity flow of the milk or milk replacer from the container 16 to the line 12. While it is appreciated that it is known to supply liquid food under a gravity flow system, such a system normally results in the settling out of the essential nutrients along the length of the supply pipe. Accordingly, by orientating the supply pipe 12 in the instant invention in a manner so as to prevent a gravity flow, the resultant loss of nutrients has been eliminated. In the instant invention, the flow is induced solely by the pump means 34, it being contemplated that the liquid food be pumped through the supply line 12 at a rate substantially greater than the rate at which the food can be consumed through the nipples 18 thus insuring that no settling out of the nutrients occurs. Further, by providing that the far or exhaust end 36 of the pipe 12 be returned to the upper end of the container, as will be noted in FIG. 2, a constant agitation of the food within the container 16 is achieved, the rapid flow of the milk or milk replacer through the supply line 12 also insuring that no excessive cooling thereof takes place.

The instant invention also contemplates the provision of both a timer 38 and an alarm 40 in circuit with the pump 34 whereby the pump can be automatically turned on and off with the alarm 40, which may be in the form of a bell or buzzer, signalling, for a predetermined length of time, the availability of liquid food within the feeding nipples 18, the animals rapidly becoming conditioned to associate the sound of the alarm 40 with the availability of food.

Inasmuch as some calves can take more food than others without adverse effects, such as scours, each of the feeder nipples 18 has a regulating valve 42 associated therewith, this valve 42 being of any adjustable conventional type.

Figure 3:
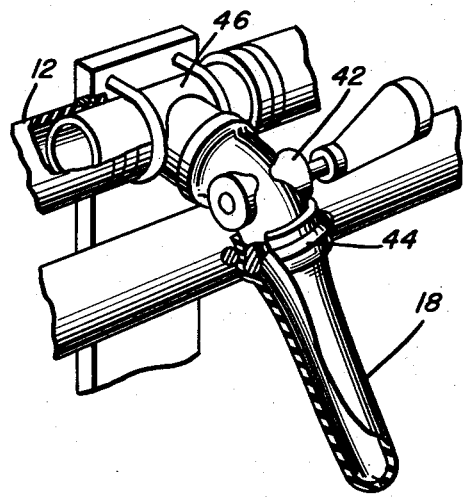
FIGURE 3 is an enlarged partial perspective view, with portions broken away for purposes of illustration, of one of the feeding nipples.

While not specifically limited thereto, it will be noted that, in FIG. 3, one manner of associating a feeder nipple with the supply line 12 has been illustrated, the nipple being secured to one end of the valve housing by a lockring 44 with the opposite end of the valve housing being secured to a T connector 46 which in turn has the ends of the cross portion thereof locked within adjoining ends of sections of the supply line 12.

While not specifically illustrated, it will be appreciated that a conventional extension pipe can be provided between each regulator valve 42 and the corresponding nipple 18 if it becomes desirable to locate the nipple lower for enabling access thereto by smaller animals such as pigs. Further, such an extension pipe can, if so desired, be directed into a feeding trough without the nipple thereon, the automatic feeder 10 operating in the same manner as described supra with the predetermined amount of liquid food being introduced into the trough, this food, upon introduction, containing all of the essential nutrients, no loss of nutrients having occurred during the flow of the food from the container 16 through the supply line 12.

In operation, the feed container 16 is filled to a predetermined level and maintained at a constant even temperature by the thermostatically controlled heating element 28 heating the water 26 surrounding the feed container 16. At selected times, controlled by the timer 38, the pump 34 is activated and the liquid food is forcibly pumped through the supply pipe 12 at a rate greater than the expected rate of consumption through the feeder nipples 18 with the unconsumed liquid food being returned under force to the upper end of the container 16, this arrangement preventing any tendency for the nutrients to settle out.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In an automatic liquid feeder for animals, a closed wall feed container, a single elongated animal feed supply line, said supply line having one end thereof in communication with the interior of the feed container through the walls adjacent the bottom thereof, and the other end thereof in communication with the interior of the container through the walls adjacent the top thereof, a plurality of feeding nipples communicated with said supply line at longitudinally spaced points therealong, and pump means operatively associated with said supply line for effecting the forced circulation of feed from the bottom of the container through the supply line and back into the top of the container, said supply line, outwardly from the first end thereof communicated with the bottom of the container, extending vertically to a height generally above the normal uppermost feed level of the feed container and maintaining this height throughout the feeding nipple portion until communicated with the upper end of the container, thereby preventing gravity flow of the feed from the container into the supply line.

2. The device of claim 1 including a heating means for said feed container, said heating means consisting of an enlarged sealed insulated water tank enclosing the feed container, said tank being substantially filled with water and including a thermostatically controlled heating element therein orientated so as to heat the water and thereby surround the container with the heated water for rapidly and evenly heating the container and maintaining the heat therein.

3. The device of claim 2 including individual regulator valves associated with each feeding nipple for diverting a portion of the supply line flow through the corresponding nipple.

4. The device of claim 3 including a timer in circuit with said pump for regulating the operation thereof, and an alarm for indicating the activation of the pump.

References Cited by the Examiner

UNITED STATES PATENTS

| | | | |
|---|---|---|---|
| 1,207,052 | 12/16 | Johnson | 119—73 |
| 1,249,999 | 12/17 | Page | 119—73 |
| 1,560,528 | 11/25 | Baum | 119—73 |
| 2,158,226 | 5/39 | Elsey | 119—71 |
| 2,578,863 | 12/51 | Trelease | 119—51 |
| 2,619,935 | 12/52 | Reynolds et al. | 119—51 |
| 2,629,360 | 2/53 | Hoffman | 119—71 |
| 2,678,026 | 5/54 | Rue et al. | 119—73 |
| 2,929,356 | 3/62 | Dacigalupo | 119—51 |
| 3,037,481 | 6/62 | Kloss | 119—71 |
| 3,049,094 | 8/62 | Smith | 119—73 |
| 3,097,627 | 7/63 | Garcia | 119—71 |

SAMUEL KOREN, *Primary Examiner.*

ALDRICH F. MEDBERY, *Examiner.*